UNITED STATES PATENT OFFICE.

JOHN GODFREY DIETRICH, OF McMINNVILLE, OREGON.

BEVERAGE AND PROCESS OF MAKING SAME.

1,249,044.  Specification of Letters Patent.  Patented Dec. 4, 1917.

No Drawing.  Application filed July 11, 1917. Serial No. 179,797.

*To all whom it may concern:*

Be it known that I, JOHN G. DIETRICH, a citizen of the United States, and a resident of McMinnville, in the county of Yamhill and State of Oregon, have invented a new and Improved Beverage and Process of Making Same, of which the following is a full, clear, and exact description.

My invention relates to a beverage, when sufficient water has been added to the product, having substantially the composition of human milk, and to the process of manufacturing the same.

The object of the invention is to make from cow's milk the counterpart, in concentrated form, of human milk.

I am aware that there are a number of processes for making such a substitute but none has proven practically or commercially successful, for the reason that due to defects of processes previously attempted it was impossible to conserve it for a sufficient length of time. The main trouble has been that the sugar content crystallizes out from the substitute and renders the product worthless for the purpose originally intended. The reason for this was the over-concentration of the substitute, in which the quantity of sugar, in no matter what shape present, was too large.

I have discovered that if the substitute is of a concentration such that the sugar content is not in excess of 16% of the whole product it will keep indefinitely after it has been perfectly homogenized and sterilized in the usual way. I have also discovered that if the sugar content does not exceed 16% of the whole, the product may be obtained without recourse to evaporation *in vacuo*, which is expensive and not reliable.

My process is substantially as follows: Fresh cow's milk, properly cooled immediately after milking, is analyzed for its respective percentages of butter-fat, protein and milk sugar. As an example, assuming the test to reveal the contents of a batch of milk to be,—fat 4.00%, protein 3.30%, milk sugar 4.95%. The average human milk contains,—fat 3.30%, protein 1.50%, milk sugar 6.80%.

Taking the protein content of each as a basis, it will be seen that the butter-fat and milk sugar in the finished product must bear the same relative proportion to like substances in human milk, as 3.30 is to 1.50=2.2, 3.30 being the protein in the finished product. It will be noted that the protein in cow's milk being considerably more than twice that of human milk, no addition of protein is made. Accordingly, if to the resulting product no protein is to be added, the concentration will have to be 2.2. The product will, therefore, contain 7.26 of butter-fat, 3.30 of protein, and 14.96 of milk sugar. And to obtain this from cow's milk it will be necessary to add 3.26% of butter-fat in any suitable form, and 10.01% of milk sugar in syrup form.

It is self-evident that it will be necessary to make slight allowance or correction for the protein and milk sugar contents in the cream or butter-fat added, also an allowance must be made for the small water content in the milk-sugar syrup added. Such corrections, however, are inconsequential and can easily be made by one skilled in the art.

After such additions have been made the entire mass is carefully and thoroughly stirred until the mixture is homogeneous throughout. It is then boiled to arrest bacterial growth, and put through a homogenizing machine to break up and incorporate the fat and protein through the entire body of the product. The product is then thoroughly and rapidly cooled to 50° F. to retard bacterial development. The product is then sealed in suitable containers and sterilized in the usual way.

The resulting product has all the essential qualifications of human milk in concentrated form, and in such form can be easily and cheaply transported to distant points, and it has been obtained without recourse to the expense of evaporation *in vacuo*. By this process I have obtained a milk that will hold each constituent element in perfect solution or emulsion for the reason that the milk sugar in solution has not reached a percentage great enough to cause crystallization or precipitation. The homogenization of the product prevents butter-fat or cream in the milk from separating and rising to the surface. Being sterilized and hermetically sealed it will keep in any climate.

It must be clearly understood that the example given is only illustrative. The proportions of the ingredients may be varied in accordance with the concentration of the milk; but it is important that the sugar content of the product should not exceed 16% of the whole.

I claim:

1. As an article of manufacture, a counterpart of human milk in concentrated form which contains substantially,— butter-fat 7.26%, protein 3.30%, and milk sugar 14.96%.

2. A process of making a counterpart of human milk in concentrated form without recourse to vacuum, which consists in taking fresh cow's milk, cooling immediately after milking, and then adding butter fat and milk sugar in syrup form, to bring the ingredients of the resulting product into the ratio in which said ingredients are found in human milk, stirring the cow's milk with added ingredients until the mixture is homogeneous throughout, boiling the product to arrest bacterial growth, passing same through a homogenizing machine to break up and incorporate the fat and casein evenly throughout the product, cooling the product rapidly to 50° F. to retard bacterial development, sealing the product in suitable containers, and sterilizing in the usual way.

JOHN GODFREY DIETRICH.